United States Patent
Taylor et al.

(10) Patent No.: US 11,196,174 B2
(45) Date of Patent: Dec. 7, 2021

(54) MESH REFLECTOR SATELLITE ANTENNAS WITH ON-ORBIT EXTRUDED OR PRINTED SUPPORT STRUCTURE

(71) Applicant: Eagle Technology, LLC, Melbourne, FL (US)

(72) Inventors: Robert M. Taylor, Rockledge, FL (US); Philip J. Henderson, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/020,501

(22) Filed: Sep. 14, 2020

(65) Prior Publication Data

US 2020/0412007 A1    Dec. 31, 2020

Related U.S. Application Data

(62) Division of application No. 16/013,576, filed on Jun. 20, 2018, now Pat. No. 10,819,038.

(51) Int. Cl.
*H01Q 1/28* (2006.01)
*H01Q 15/16* (2006.01)
(Continued)

(52) U.S. Cl.
CPC .......... *H01Q 15/162* (2013.01); *B29C 64/10* (2017.08); *B33Y 10/00* (2014.12); *B33Y 80/00* (2014.12);
(Continued)

(58) Field of Classification Search
CPC ...... H01Q 15/162; H01Q 1/085; H01Q 1/288; H01Q 15/141; H01Q 15/16; H01Q 15/161;
(Continued)

(56) References Cited

U.S. PATENT DOCUMENTS 5,488,383 A * 1/1996 Friedman ............. H01Q 15/147
112/475.08
9,608,333 B1 * 3/2017 Toledo ..................... H01Q 1/14
(Continued)

FOREIGN PATENT DOCUMENTS

| KR | 101769136 B1 | 8/2017 |
|---|---|---|
| WO | 2018/179547 A1 | 10/2018 |

OTHER PUBLICATIONS

Nakamura, K., et al., "Concept Design of 15m Class Light Weight Deployable Antenna Reflector for L-band SAR Application," AIAA SciTech Forum, Jan. 4-8, 2016, San Diego, California, USA, 3rd AIAA Spacecraft Structures Conference; copyright 2016 by the American Institute of Aeronautics and Astronautics, Inc.
(Continued)

*Primary Examiner* — Binh B Tran
(74) *Attorney, Agent, or Firm* — Fox Rothschild LLP; Robert J. Sacco; Carol E. Thorstad-Forsyth

(57) ABSTRACT

Deployable reflector antenna includes a fabrication hub in which at least one additive fabrication unit disposed. The additive fabrication unit is configured to form at least one rigid structural element of a reflector antenna system. In a stowed condition, an RF reflector material comprised of a flexible webbing is disposed in a stowed configuration proximate to the fabrication hub. A fabrication control system controls the additive fabrication unit so as to form the at least one rigid structural element. The RF reflector material is arranged to transition during the additive fabrication process from the stowed configuration in which the flexible webbing material is furled compactly at the fabrication hub, to a deployed configuration in which the flexible webbing material is unfurled.

20 Claims, 9 Drawing Sheets

(51) Int. Cl.
*B33Y 10/00* (2015.01)
*B33Y 80/00* (2015.01)
*B29C 64/10* (2017.01)
*B64G 1/22* (2006.01)
*B64G 1/66* (2006.01)
*H01Q 1/08* (2006.01)
*H01Q 15/14* (2006.01)
*B29L 12/00* (2006.01)

(52) U.S. Cl.
CPC .............. *B64G 1/222* (2013.01); *B64G 1/66* (2013.01); *H01Q 1/085* (2013.01); *H01Q 1/288* (2013.01); *H01Q 15/141* (2013.01); *B29L 2012/00* (2013.01); *H01Q 15/16* (2013.01); *H01Q 15/161* (2013.01); *H01Q 15/163* (2013.01); *H01Q 15/165* (2013.01); *H01Q 15/168* (2013.01)

(58) Field of Classification Search
CPC .. H01Q 15/163; H01Q 15/165; H01Q 15/168; B33Y 10/00; B33Y 80/00; B29C 64/10; B64G 1/66; B29L 2012/00
USPC ......................................................... 343/705
See application file for complete search history.

(56) References Cited

U.S. PATENT DOCUMENTS

| | | | |
|---|---|---|---|
| 9,656,426 B2 | 5/2017 | Snyder et al. | |
| 2005/0194401 A1 | 9/2005 | Khoshnevis | |
| 2013/0069849 A1 | 3/2013 | Toledo | |
| 2015/0001762 A1* | 1/2015 | Lacaze | B29C 64/171 264/308 |
| 2015/0144284 A1 | 5/2015 | Snyder et al. | |
| 2016/0082652 A1 | 3/2016 | Snyder et al. | |
| 2016/0352022 A1* | 12/2016 | Thomson | H01Q 1/288 |
| 2017/0036783 A1 | 2/2017 | Snyder | |

OTHER PUBLICATIONS

Jessen, S., et al., "Development of a Space Manufacturing Facility for In-Situ Fabrication of Large Space Structures," IAC-06-D3.2.04 http://arc.aiaa.org DOI:10.2514/6.IAC-06-D3.2.04.

Grim, B., et al., "MakerSat: A CubeSat Designed for In-Space Assembly," 30th Annual AIAA/USU Conference on Small Satellites, Aug. 8-11, 2016.

Hoyt, R., et al., "SpiderFab: An Architecture for Self-Fabricating Space Systems," AIAA Space 2013 Conference and Exposition; Sep. 10-12, 2013; ISBN-13: 9781624102394.

Hoyt, R., et al., "In-Space Manufacturing of Constructable Long-Baseline Sensors Using the Trusselator Technology," AIAA Space and Astronautics Forum and Exposition, Space 2016, copyright 2016 by Tethers Unlimited, Inc., Published by the American Institute of Aeronautics and Astronautics, Inc.

The Natinal Academies of Sciences Engineering Medicine, "3D Printing in Space," The National Academies Press, ISBN 978-0-309-31008-6 DOI 10.17226/18871.

Extended European Search Report dated Oct. 8, 2019, Application Serial No. EP19179679.6 in the name of Eagle Technology, LLC.

Anonymous: "Two Years on the ISS: Additive Manufacturing Facility Celebrates Nearly 100 3D Printed Parts—3DPrint.com, The Voice of 3D Printing / Additive Manufacturing", Mar. 27, 2018, Retrieved from the Internet: URL https://3dprint.com/208144/amf-second-birthday/ [retrieved on Sep. 12, 2019].

* cited by examiner

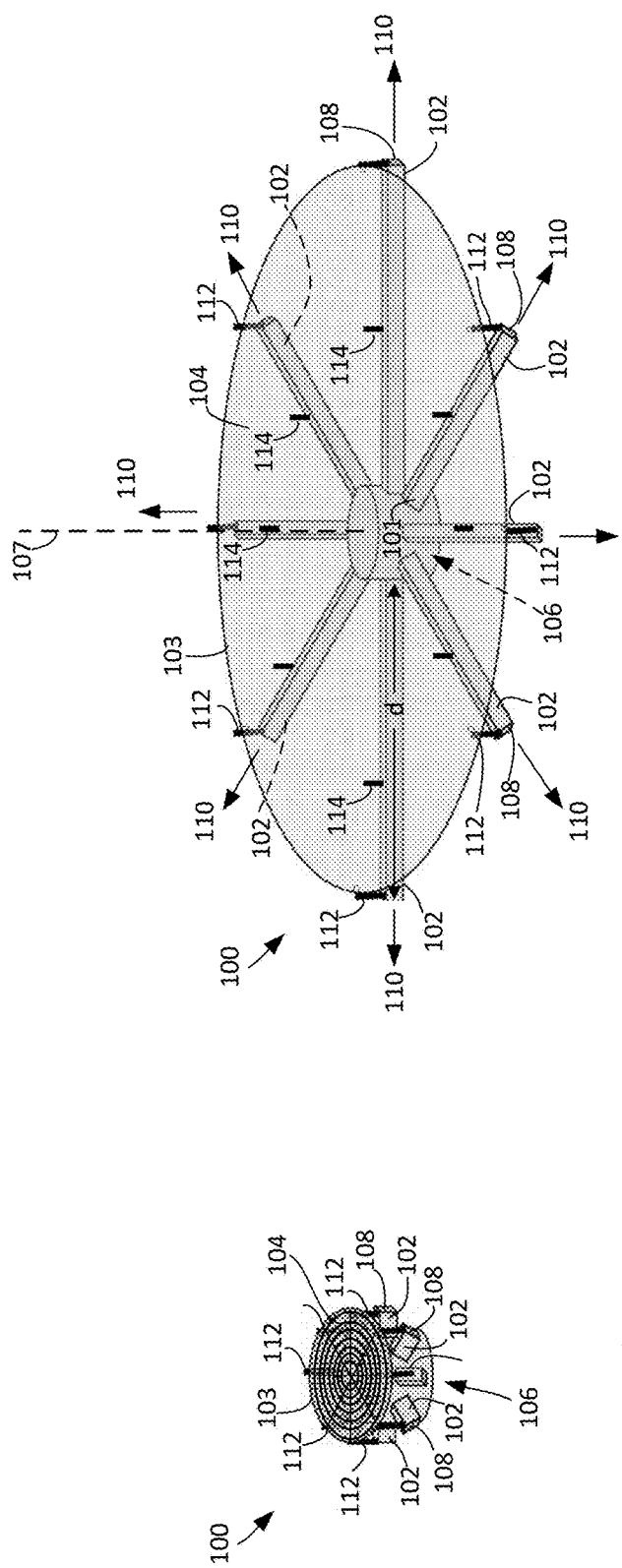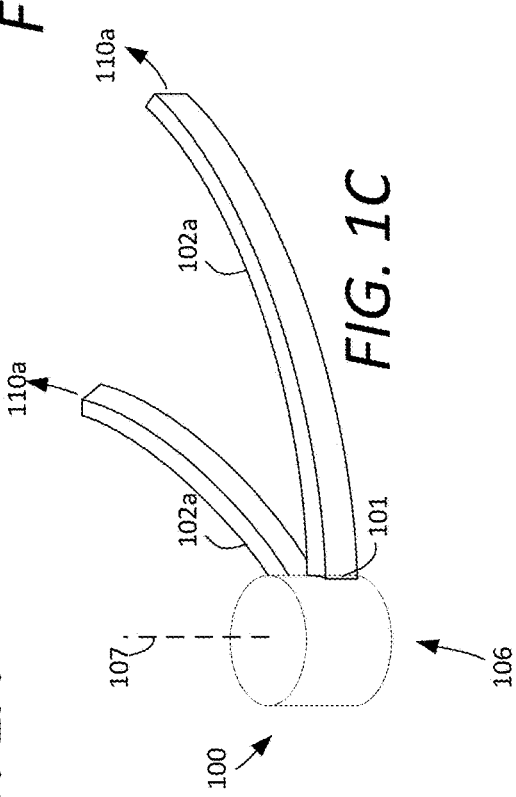

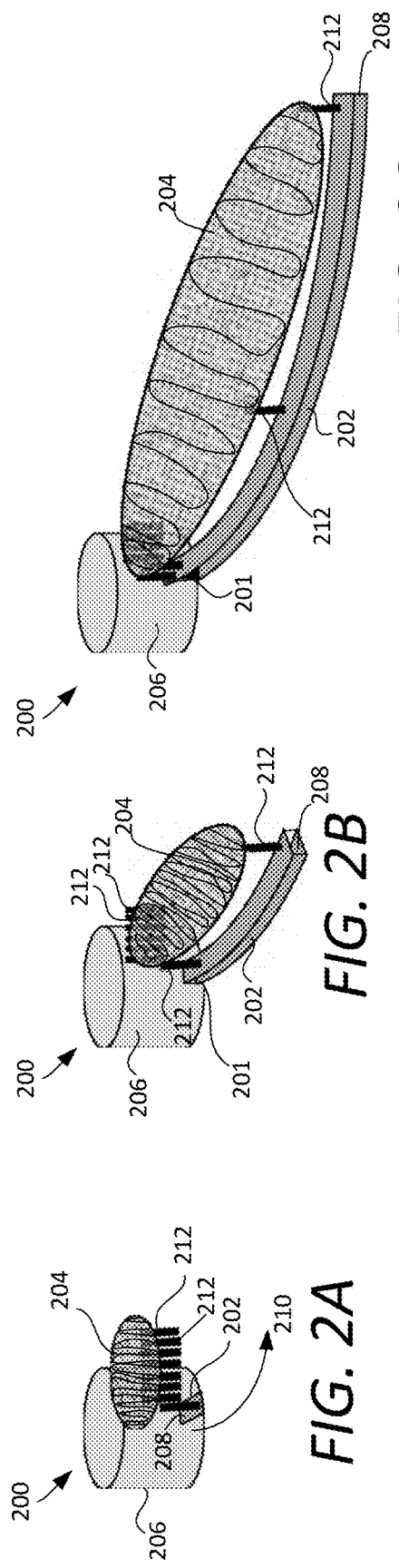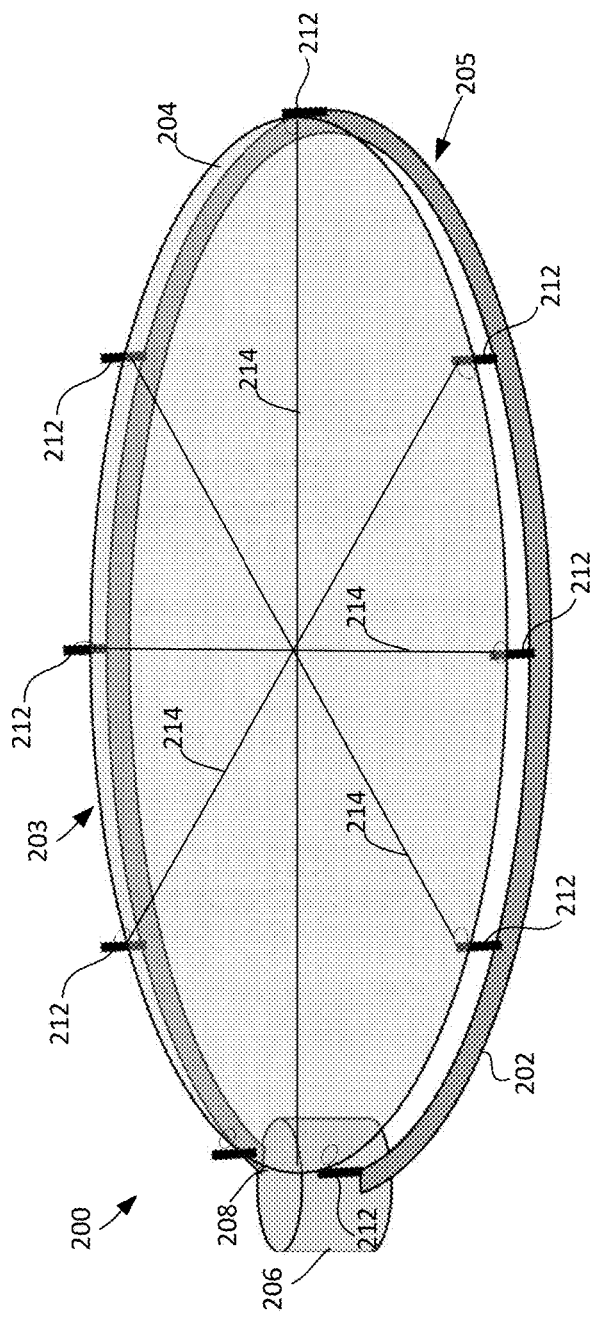

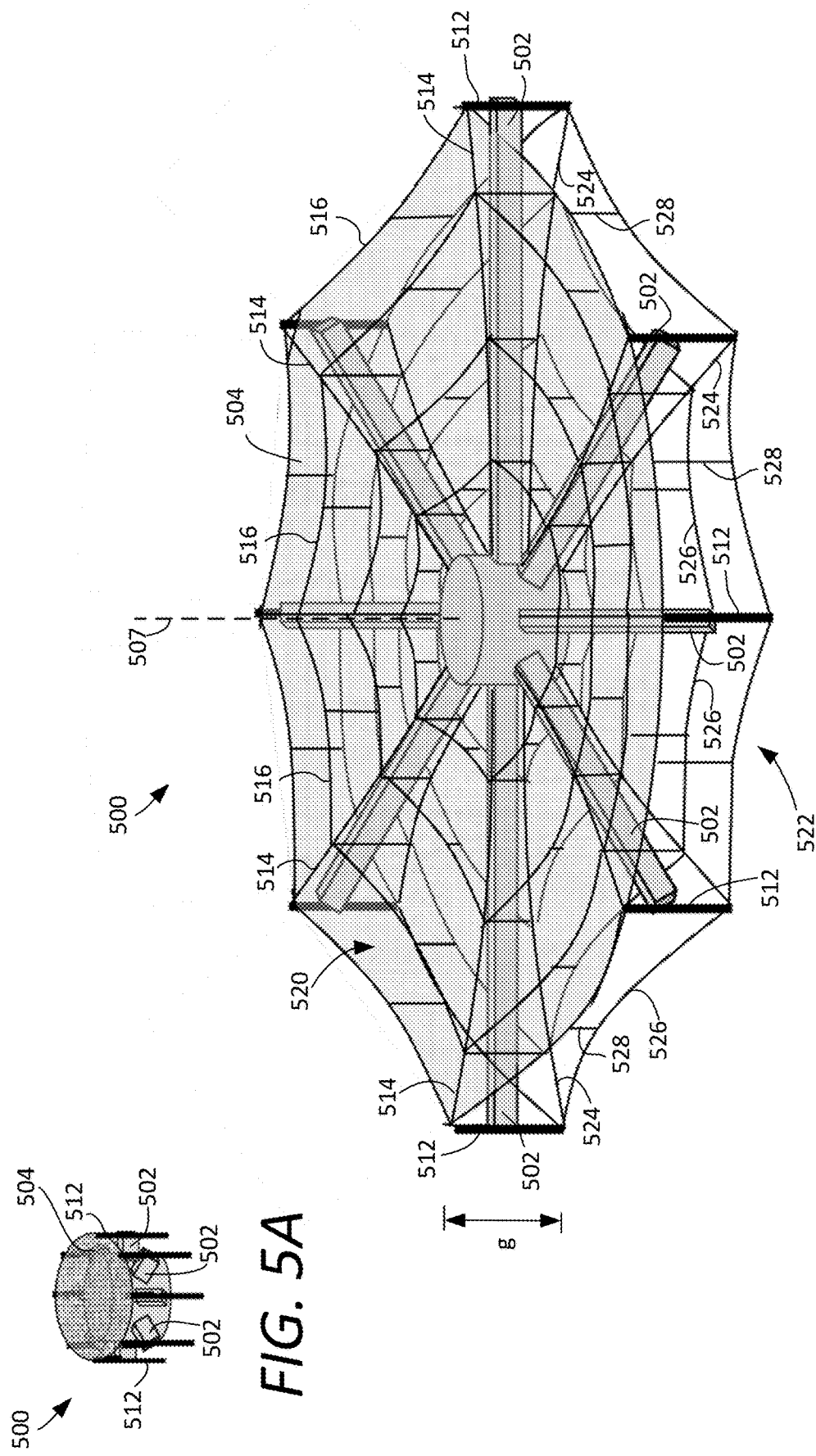

MESH REFLECTOR SATELLITE ANTENNAS WITH ON-ORBIT EXTRUDED OR PRINTED SUPPORT STRUCTURE

CROSS REFERENCE TO RELATED APPLICATIONS

This application is a divisional application and claims priority to U.S. patent application Ser. No. 16/013,576 entitled "MESH REFLECTOR SATELLITE ANTENNAS WITH ON-ORBIT EXTRUDED OR PRINTED SUPPORT STRUCTURE" filed on Jun. 20, 2018, the content of which is incorporated herewith in its entirety.

BACKGROUND

Statement of the Technical Field

The technical field of this disclosure comprises reflector antennas, and more particularly concerns deployable mesh reflectors for satellites.

DESCRIPTION OF THE RELATED ART

Deployable structures are used to create a structure on orbit that is larger than the volume available in the launch vehicle. For typical deployable structures, the structure is folded or compacted to reduce the size, but retains the same basic connectivity between elements in the stowed and deployed form. But this approach has an inherent limitation. As the size of the deployed structure increases, more folds and complexity are required and less mass and volume is available as structure per deployed volume.

Many conventional methods are known for compacting structures into launch vehicles. In some scenarios, these methods involve the use of linear elements in which the length of the structure is reduced by folding or telescoping arrangements. In other scenarios, the designs involve plate-like elements which are divided into a multiplicity of smaller plates. Linear elements can be folded or stow telescopically. Plate elements can be folded over or stacked.

In a conventional reflector antenna system, a sheet material such as mesh can be stretched between structural elements to form a surface which defines an RF reflector. The sheet material is sometimes shaped by tensioned elements like cords or tapes, to help form the surface. As is known, a deployable RF reflector requires a continuous surface. In some scenarios, the surface can have a parabolic shape. Known variations of RF reflecting surfaces also include other shapes such as flat surfaces, spherical surfaces, or special shapes described by more complex polynomials. To this end, metallic woven mesh provides an excellent reflective surface that is highly compactible. Conventional mesh reflectors often have a configuration which involves an umbrella-like structure or a drum-like structure in which the mesh is disposed within a collapsing outer ring. The mesh surface is often shaped by a network of rigid cords, some of which are tangent to the mesh surface, some of which form an opposing surface at a distance offset from the mesh, and some of which connect the two surfaces in order to shape the to a paraboloid or other complex doubly-curved contour.

SUMMARY

This document concerns a method for deploying a reflector antenna system. The method involves transporting the reflector antenna system to a deployment location, such as a space-based orbital location. While at the deployment location, an additive fabrication process is employed to form one or more rigid structural elements of the reflector antenna. The one or more rigid structural elements are thereafter used to support an RF reflector material comprised of a flexible web, such as a metallic woven mesh. In some scenarios, the method can involve attaching a portion of the flexible web to a portion of a structural element and then using the additive fabrication process to facilitate deployment of the flexible web from a stowed configuration. In other scenarios, the RF reflector material is secured to the one or more structural elements after the structural element is formed. The one or more structural element can also support a network of cords which help to control a shape of the flexible web.

According to one aspect, the additive fabrication process used to form the rigid structural element is a 3D printing process in which material is sequentially deposited in layers. In other scenarios, the additive fabrication process can be an extrusion or pultrusion process in which a material comprising the one or more rigid structural element is urged through a die.

The additive fabrication process applied can be performed at a central hub. For example in some scenarios a plurality of the rigid structural elements are formed so as to extend in radial directions originating at the central hub. Further, a peripheral edge of the flexible web can be secured to a tip end of each of the rigid structural elements distal from the central hub. For example, the peripheral edge can be secured directly to the tip end of each rigid structural member, or indirectly through an offset member which extends from the tip end in at least one direction transverse to the rigid structural element. Consequently, the flexible web can be deployed by causing the tip ends to extend in radial directions as a result of the additive fabrication process. The flexible web can also be secured to each of the rigid structural elements at predetermined intervals as the additive fabrication process progresses.

As an alternative, the additive fabrication process can involve forming the one or more rigid structural elements to extend along a non-linear path extending from a perimeter hub. The additive fabrication process can continue until the non-linear path results in a distal end of the one or more rigid structural elements returning to the perimeter hub. According to one aspect, the non-linear path can be selected to include a curved path forming a hoop that begins and ends at the perimeter hub. The flexible web can be secured to the hoop at predetermined intervals along the non-linear path as the additive fabrication process progresses.

In some scenarios, the additive fabrication process forms a plurality of the rigid structural elements to extend linearly from a perimeter hub. The additive fabrication process can be controlled to selectively form the plurality of rigid structural elements to have different predetermined lengths. In such a configuration, at least one point along a peripheral edge of the flexible web can be secured to the peripheral hub. A peripheral edge of the flexible web can also be secured to a tip end of each of the rigid structural elements distal from the peripheral hub. The flexible web can be deployed by causing the tip ends to extend from the peripheral hub as a result of the additive fabrication process.

The solution also concerns a deployable reflector antenna system. The system includes a fabrication hub comprising a rigid chassis. One or more additive fabrication units (AFUs) can be disposed at the fabrication hub. Each AFU is configured to utilize an additive fabrication process to form at least a portion of one or more rigid structural element of a reflector antenna system. The system also includes an RF reflector material comprised of a flexible webbing and disposed in a stowed configuration proximate to the fabrication hub. For example, in some scenarios the flexible webbing can be comprised of a metallic woven mesh. A fabrication control system is also included. The fabrication control system is configured to control the AFU so as to form the one or more rigid structural elements. The RF reflector material is arranged to transition during the additive fabrication process from the stowed configuration in which the flexible webbing material is furled compactly at the fabrication hub, to a deployed configuration in which the flexible webbing material is unfurled to define a reflector surface having a predetermined shape. According to one aspect, the RF reflector material is secured directly or indirectly to the one or more rigid structural element. The RF reflector material can be supported and shaped by a network of cords which are secured directly or indirectly to the one or more rigid structural elements.

In some scenarios, the additive fabrication unit is configured to sequentially deposit a material in layers to form the one or more rigid structural element. In other scenarios the additive fabrication unit is an extrusion or pultrusion system which is configured to urge a material which comprises the one or more rigid structural element through a die.

The one or more AFUs can be responsive to the fabrication control system so as to form a plurality of the rigid structural elements. For example, in some scenarios the one or more AFUs can be configured to form the plurality of rigid structural elements which extend in radial directions originating at the fabrication hub. One or more of the AFUs can also be configured to form the one or more rigid structural element so as to extend along a non-linear path extending from the fabrication hub. In some scenarios, the additive fabrication control system is configured to cause the AFU to selectively continue with forming the one or more rigid structural elements until the one or more rigid structural element forms a hoop.

In the systems which is described, the RF reflector material can be connected to the one or more rigid structural elements at a tip end distal from the fabrication hub. In some scenarios, the RF reflector material is secured directly to the tip end but in other scenarios can be secured to an offset member disposed at the tip end. In such a scenario, the offset member can extend in a direction transverse to an elongated length of the rigid structural element. The reflector of the deployable reflector antenna system can have an axial depth which is facilitated by the offset member. Consequently, a first surface defined by the RF reflector material can be spaced a predetermined distance from an opposing second surface of the antenna system defined by a network of cords.

BRIEF DESCRIPTION OF THE DRAWINGS

This disclosure is facilitated by reference to the following drawing figures, in which like numerals represent like items throughout the figures, and in which:

FIGS. 1A-1C are a series of drawings that are useful for understanding a radial arm reflector antenna system with a deployable support structure formed by an additive fabrication process.

FIGS. 2A-2D are a series of drawings that are useful for understanding a ring or hoop type reflector antenna system with a deployable support structure formed by an additive fabrication process.

FIGS. 5A and 5B are a series of drawings which are useful for understanding deployment of a cord network in a radial arm reflector antenna system.

DETAILED DESCRIPTION

Figure 3:
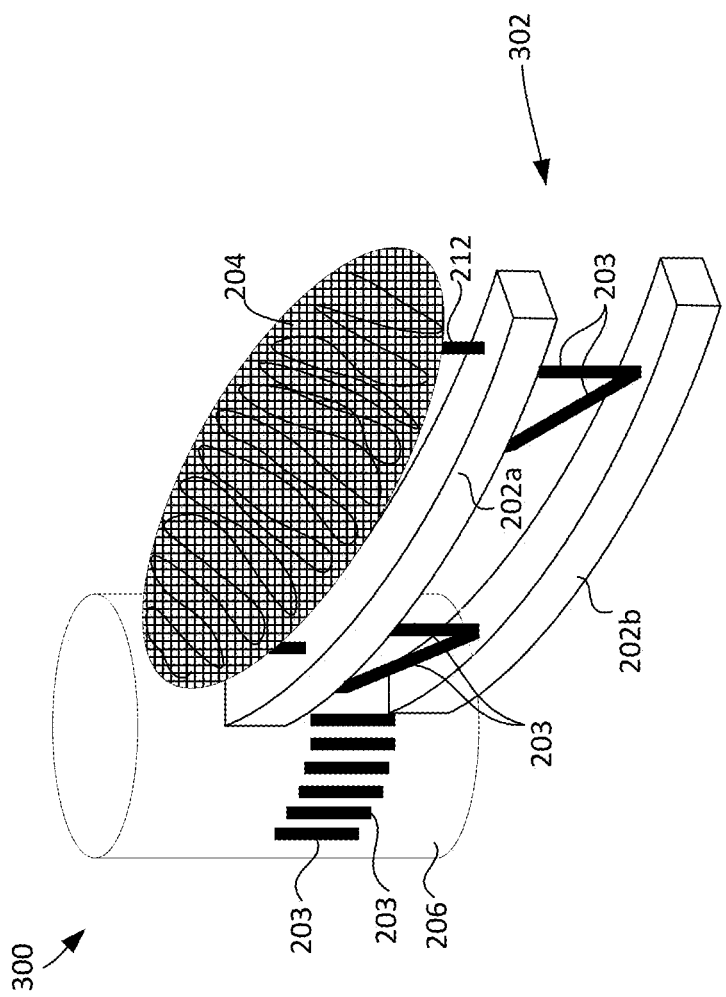
FIG. 3 is a drawing that is useful for understanding an alternative type of ring or hoop structure that can be used in the antenna system shown in FIGS. 2A-2D.

It will be readily understood that the components of the systems and/or methods as generally described herein and illustrated in the appended figures could be arranged and designed in a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

A solution for a deployable mesh reflector antenna system disclosed herein makes use of an additive fabrication process performed at a deployment location to form one or more rigid elements which define the antenna support structure. The solution can be applied to any deployment location but is particularly advantageous when applied to on-orbit locations for spaced-based deployable mesh reflector antennas. As such, the method can begin by transporting a reflector antenna system to a deployment location such as an orbital location where the antenna is to be deployed. After the antenna system arrives on station or in an orbital environment, an additive fabrication process is used to form one or more rigid structural elements of a reflector antenna. The one or more structural elements are used to support radio frequency (RF) reflective material comprised of a flexible web. In some scenarios, the rigid elements can be formed by utilizing an extrusion or pultrusion process, whereby the unformed material in a compliant, formable or fluid state is pushed through a die and allowed to cure. Deposition of the unformed material may be in layers perpendicular or parallel to the long axis of the beam. In other scenarios, the material may be stored in a rolled form and passed through a guide that reforms the material by heat, strain energy, or chemical curing into a stable extended beam state. Variations of the described solution can be applied to facilitate several different types of deployable antenna structures.

In one scenario shown in FIGS. 1A and 1B, the solution can involve a central hub and a plurality of rigid structural elements comprised of radial ribs in deployable reflector antenna system 100. FIG. 1A shows the antenna system 100 in a stowed configuration, and FIG. 1B shows the antenna system in a fully deployed configuration. Accordingly, the transition from FIG. 1A to FIG. 1B can be understood to illustrate an antenna deployment process.

As shown in FIGS. 1A and 1B, the antenna system 100 includes a central hub 106 having a central axis 107. A plurality of spoke-like structural members 102 extend from the hub 106 in radial directions 110 as shown. The structural members 102 support a radio frequency (RF) reflector 103. RF reflector 103 is comprised of a flexible web material 104 which is collapsible for transport and/or stowage (as shown in FIG. 1A) and extendible for deployment (as shown in FIG. 1B). The flexible web material 104 can in some scenarios be comprised of a conductive mesh material. For example, the RF reflector material can be an electrically conductive woven mesh, knit mesh, or other tensioned membrane RF reflective surface material. Still, the disclosure is not limited in this regard and other RF reflective material types are also possible.

The structural members 102 are comprised of a formable material such that they can be formed by extruding or printing in an additive fabrication process. As part of this additive fabrication process, the structural members are caused to extend a predetermined distance in radial directions 110 during a deployment process. During this process the structural members are caused to "grow" from central hub 106 by the addition of the formable material at the hub end 101. For example, by extruding or adding material to the structural members 102 at the hub 106, the tip ends 108 can be caused to push out or extend in radial directions 110 from a first position adjacent to the hub as shown in FIG. 1A to a second position spaced a distance d from the hub as shown in FIG. 1B.

According to one aspect, the flexible web material 104 which comprises the reflector surface can be attached at least at the tip ends 108 of each radial arm, which are distal from the central hub. For example, offset elements 112 which are secured to the flexible web material 104 can be used to facilitate this attachment. The offset elements 112 can be rigid members which are securely attached to the flexible web material 104 and to the structural members 102. The flexible web material can be folded to store compactly when in the stowed configuration shown in FIG. 1A.

With the foregoing arrangement, the flexible web material 104 comprising the reflector surface will be unfurled or unfolded to extend outwardly from its stowed condition at the central hub 106 to the deployed condition as each of the structural members 102 grow in length as the additive fabrication process progresses. The flexible web material can be attached to the radial arms exclusively at the tip ends 108 but in some scenarios it can be advantageous to also provide attachment with additional connector elements 114 at predetermined intervals along the length of each of the radial arms 102 as they grow or are formed during the additive fabrication process. These additional connector elements can be secured to the flexible web material before or after the additive fabrication process is completed. Each structural member 102 can be formed by a separate additive fabrication mechanism (not shown). However, in other scenarios it is contemplated that a shared fabrication mechanism can add material to each radial arm serially in an incremental process.

FIG. 1C is useful for understanding an alternative arrangement for an antenna system similar to that described with respect to FIGS. 1A and 1B. However, instead of a linear deployment or growth of structural members 102 as shown in FIG. 1B, each structural member or radial arm 102a can be fabricated in an additive process to define a curved or arcuate structure extending in directions 110a to facilitate a parabolic or other similar type reflector surface having a central axis aligned with hub axis 107. Other configurations with curved structural members are contemplated where the hub axis is not central and not aligned with the central axis such as for an offset parabolic reflector.

In another scenario illustrated in FIGS. 2A-2D, the antenna support structure of a reflector antenna system 200 can be comprised of one or more curved rigid elements 202. The one or more curved rigid elements 202 can extend in direction 201 from a peripheral hub 206 to form a rib tube or hoop 205 as shown in FIG. 2D. In such a scenario, a RF reflector surface 203 comprised of a flexible web material 204 and surface shaping tension members. For example a tensioned network of cords and ties can be secured at predetermined intervals along the curved length of the hoop 205 as the additive fabrication process progresses. This tensioned network of cords can include catenary cords 214, which will be discussed below in greater detail. The flexible web material 204 is collapsible for transport and/or stowage (as shown in FIG. 2A) and extendible for deployment (as shown in FIGS. 2B-2D). The flexible web material 204 can in some scenarios be comprised of a conductive mesh material. For example, the RF reflector material can be a metallic woven mesh. Still, the disclosure is not limited in this regard and other RF reflective material types are also possible.

Connector elements 212 can be used to facilitate the connection of the flexible web material 204 to the curved rigid element 202. The connector elements can be rigid members which are securely attached to the flexible web material 204 and to the structural member 202. As shown in FIGS. 2A-2C, the length of the curved rigid element 202 can be caused to continue growing or extending by means of the additive fabrication process at the peripheral hub 206. This process continues until such time as a tip end 208 of each curved rigid element(s) 202 rejoins the peripheral hub from which it originated. In FIG. 2D the curved rigid element 202 is shown fully extended so that it. If two or more of the curved rigid elements 202 are used to form the hoop 205, then each curved rigid element can be formed by a separate additive fabrication mechanism. However, in other scenarios it is contemplated that material added can be serially to each curved rigid element 202 in an incremental process until each curved element is completed.

The structural member 202 is comprised of a curable material and can be formed by extruding or printing in an additive fabrication process. As part of this additive fabrication process, the structural member 202 is caused to extend or grow a predetermined distance in direction 210 during a deployment process. During this process the structural member 202 is caused to grow from peripheral hub 206 by the addition of the curable or formable material at the hub end 201. For example, by extruding or adding material to the structural member 202 at the hub end 201, the tip end 208 can be caused to push out or extend in the curved direction indicated by arrow 210 from the position shown in FIG. 2A to the positions shown in FIGS. 2B, 2C and finally 2D. In one scenario, the connector elements 212 can be securely attached to between a periphery of the flexible web material 204 and the structural member 202 as the structural member is formed at the hub end 201.

With the foregoing arrangement, the flexible web material 204 which comprises the reflector surface 203 will be urged outwardly from the peripheral hub to unfurl from its stowed condition at the central hub 206 (shown in FIG. 2A) to the deployed condition (shown in FIG. 2B). This unfurling process will naturally occur as additional structural members 202 are connected between the web and the structural member, and the structural member 202 is caused to grow in length.

In FIGS. 2A-2D only a single curved rigid element 202 is shown. But it should be appreciated that one or more additional curved rigid elements could be provided to increase the overall rigidity of the antenna support structure. For example, such an arrangement could comprise a perimeter truss with two hoops joined with vertical and/or diagonal members. Such a scenario is shown in FIG. 3 in which two curved rigid elements 202a, 202b are grown in an additive fabrication process to form the perimeter truss 302 in antenna system 300. The perimeter truss 302 is grow in a manner similar to that which is shown in FIG. 2A-2D to form two hoops of an antenna support structure. In FIG. 3, the curved rigid elements 202a, 202b are connected by means of vertical and/or diagonal truss connector elements 203 which are disposed at intervals along the length of each hoop. The truss connector elements can be connected to the curved rigid elements 202a, 202b as the curved rigid elements are formed or after they are formed.

In another scenario shown in FIG. 4, an offset fan-beam reflector is formed with antenna system 400. A plurality of elongated support beams 402 or arms are formed in an additive fabrication process from one side of a peripheral hub 406. The plurality of elongated support beams 402 are caused to extend in directions 410. In the scenario shown in FIG. 4, the support beams 402 are formed along an arc corresponding to one side wall 407 of the peripheral hub 406 so that they extend across a space which defines a reflector aperture 409. In some scenarios, each elongated support beam 402 can be formed by a separate additive fabrication mechanism. However, in other scenarios it is contemplated that material can be incrementally added in a serial fashion to each elongated support beam until each arm is completed.

Figure 4B:
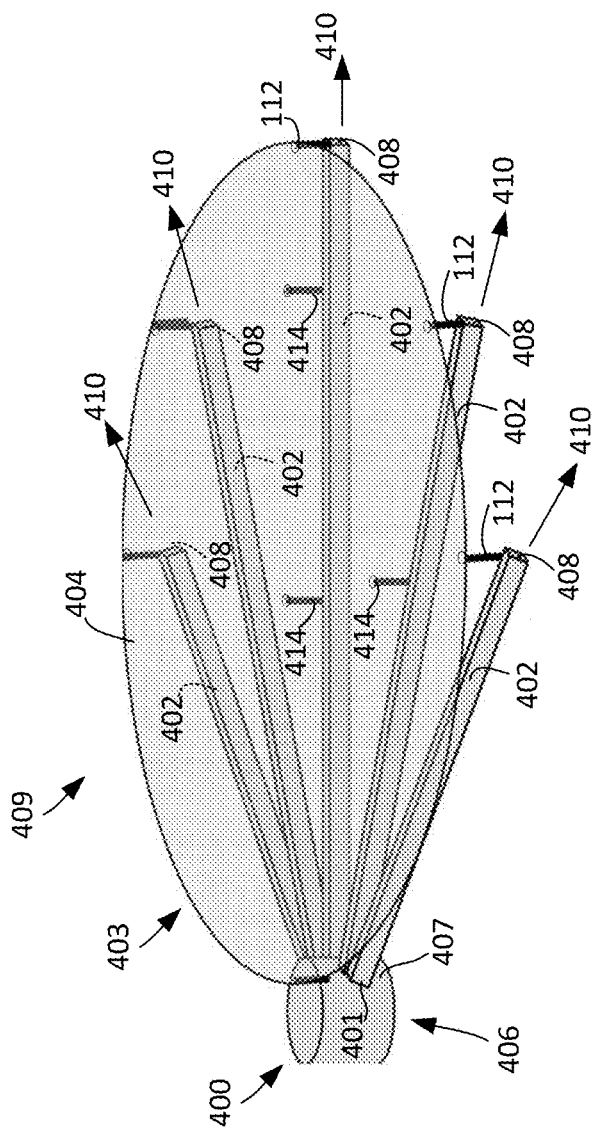
FIGS. 4A and 4B are a series of drawings that are useful for understanding an edge-mount offset reflector antenna system with a deployable support structure formed by an additive fabrication process.
Figure 4A:
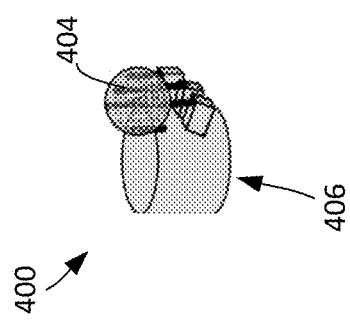

The structural members 402 support an RF reflector 403. RF reflector 403 is comprised of a flexible web material 404 which is collapsible for transport and/or stowage (as shown in FIG. 4A) and extendible for deployment (as shown in FIG. 4B). The flexible web material 404 can in some scenarios be comprised of a conductive mesh material. For example, the RF reflector material can be a metallic woven mesh. Still, the disclosure is not limited in this regard and other RF reflective material types are also possible.

The structural members 402 are comprised of a curable material and are formed by extruding or printing in an additive fabrication process. As part of this additive fabrication process, the structural members 402 are caused to extend a predetermined distance in directions 410 during a deployment process. More particularly, the structural members 402 are caused to "grow" from a peripheral hub 406 by the addition of the curable or formable material at the hub end 401. For example, by extruding or adding material to the structural members 402 at the hub 406, the tip ends 408 can be caused to push out or extend in the directions indicated by arrows 410 from the position shown in FIG. 4A to the position shown in FIG. 4B. In some scenarios, the additive fabrication process can be controlled to selectively form the plurality of rigid structural elements 402 to have different predetermined lengths as shown in FIG. 4B.

According to one aspect, the flexible web material 404 which comprises the reflector surface 403 can be attached at least at the tip ends 408 of each structural members which are distal from the peripheral hub. For example, connector elements 412 which are secured to the flexible web material 404 can be used to facilitate this attachment. The connector elements can be rigid members which are securely attached to the flexible web material 404 and to the structural members 402.

With the foregoing arrangement, the flexible web material 404 comprising the reflector surface will be urged outwardly or unfurled from its stowed condition as the deployment process progresses. More particularly, the flexible web material will be initially be folded or stowed at the central hub 406 as shown in FIG. 4A. As the additive fabrication process proceeds the flexible web material will be unfurled or extended to the deployed condition as shown in FIG. 4B. This unfurling process will naturally occur as additional structural members as the structural member 402 is caused to grow in length since each structural member 401 will be attached at a tip end 308 to a peripheral edge of web material.

The flexible web material can be attached to the structural members or arms 402 exclusively at the tip ends 408 as shown. But in some scenarios it can be advantageous to also provide attachment with additional connector elements 414 at predetermined intervals along the length of each of the structural members 402 as they grow or are formed during the additive fabrication process. These additional connector elements can be secured to the flexible web material before or after the additive fabrication process is completed. It will be appreciated that each structural member 402 can be formed by a separate additive fabrication mechanism (not shown in FIG. 4). However, in other scenarios it is contemplated that a shared fabrication mechanism can add material to each radial arm serially in an incremental process.

FIGS. 1-4 conceptually illustrate certain aspects of various reflector antenna systems which can be facilitated through the use of structural members formed on orbit by way of an additive fabrication process. In these drawings much of the structural detail has been omitted in each case to avoid obscuring the basic concepts associated with the deployment of the antenna system. For example, these structural details can in some scenarios include a network of cords to facilitate a more precise shaping of the RF reflector surface formed by the flexible webbing.

Referring now to FIGS. 5A-5B there is shown an example of a deployable antenna system 500 which deploys in a manner similar to the antenna system described herein with respect to FIGS. 1A-1B. As such, FIGS. 5A-5B show that the antenna system 500 has an RF reflector comprised of a flexible webbing (e.g., mesh) 504, offset elements 512, and spoke-like structural members 502. But the antenna system 500 also includes a network of cords which can be included to shape the RF reflector surface. For example, the network of cords can facilitate shaping of the flexible webbing into a paraboloid or other complex doubly-curved contour.

Some of the cords 514, 516 in the network can extend in directions which are tangent to the flexible webbing 104 to form a first surface 520. These cords 514, 516 can be used to increase the stiffness and durability of the mesh or other material which comprises the webbing 504. In some scenarios, the structural support members 502 can include offset members 512. For example, such offset members 512 can be disposed at a distal end of each structural support member 502, remote from a central hub. As shown in FIG. 5B, the offset members 512 can function to help facilitate a gap of some distance g between the first surface 520 and a second surface 522. In this regard it can be observed that each of the offset members 512 can extend in opposing directions from the structural support members 502, in directions aligned with the central axis 507. This arrangement can facilitate the provision of a certain degree of depth to the reflector system 500 as between the first and second surfaces.

The second surface 522 can be defined by a second set of cords 524, 526 in a network that is curved in the opposite sense as compared to the first surface 520. A third set of cords 528 which extend in a direction roughly perpendicular to both the first and second surface (aligned with the central hub axis 507) are used to pull the two surfaces 520, 522 together, thereby shaping the flexible webbing 504 into a desired contour (e.g., a doubly curved contour). Additional rigid offsets may be attached to the rib between the two surfaces to carry compressive loads from the cord network.

When the reflector antenna 500 is in its stowed configuration, the network of cords described herein can be stored compactly with the flexible webbing (e.g., mesh) 504. The additive fabrication process described herein will cause each of the structural support members 502 to grow from the configuration shown in FIG. 5A to the configuration shown in FIG. 5B. The flexible webbing is attached or connected to the offset members 512 disposed at the tip ends of the structural support members. Accordingly, the flexible webbing will be unfurled from its stowed configuration as the structural members grow. The network of cords 514, 516, 524, 526, 528 are attached to the flexible webbing and will therefore also be deployed with the flexible webbing 504 as the additive fabrication process progresses. Consequently, both the network of cords and the flexible webbing will be concurrently extended from a stowed configuration to a deployed in which the antenna achieves its final predetermined shape shown in FIG. 5B.

Figure 6A:
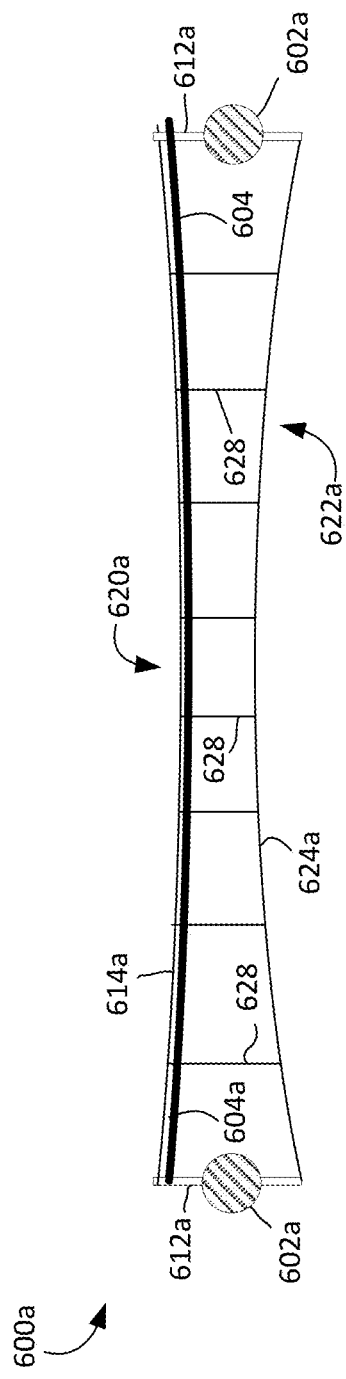
FIGS. 6A-6B are a series of drawings which are useful for understanding a cord network associated with a ring or hoop type reflector antenna system.
Figure 6B:
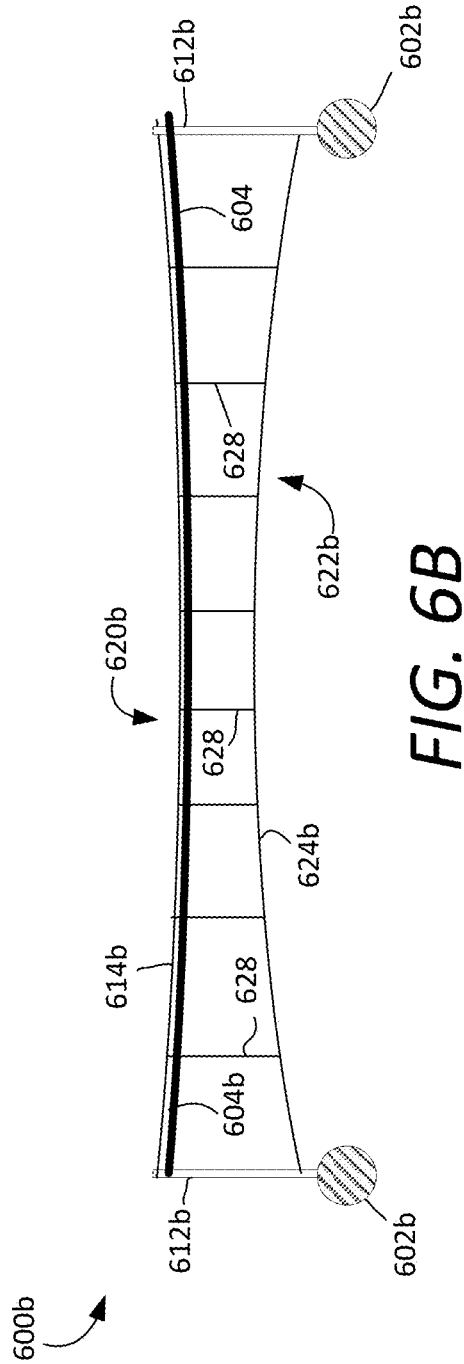

A similar network of cords can be used with a deployable reflector antenna system having a hoop-like rib tube support structure similar to that shown in FIGS. 2A-2D. The reflector antenna systems shown in FIGS. 6A and 6B are shown in cross section to facilitate disclosure of the cord network. The reflector antenna systems 600a, 600b are each comprised of a hoop or rib tube 602a, 602b which forms a support structure similar to hoop 202. Likewise the antenna systems also include flexible webbing 604a, 604b which forms a conductive reflecting surface similar to RF reflector surface 203. It can be observed that in this example the hoop or rib tubes 602a, 602b have a circular cross-section as opposed to a rectangular cross-section of the hoop shown in FIG. 2. In other respects, rib tubes 602a, 602b are similar in construction to the rib tube 202. More particularly, rib tubes 602a, 602b can be formed on orbit from a formable material by means of an additive fabrication process using the techniques described herein.

The reflector antenna systems 600a, 600b can also include offset members 612a, 612ba. Since the hoop or rib tube 602a is disposed intermediate between a front and rear antenna surface 620a, 622a, the offset member 612a can be comprised of a rigid compression standoff. In FIG. 6B, it can be observed that the hoop or rib tube 602b is not disposed between the front and rear surfaces 620b, 622b. Accordingly, the offset member 612b can be comprised of a flexible tensioned standoff. Each reflector antenna system 600a, 600b can be further comprised of a front catenary cord 614a, 614b and a rear catenary cord 624a, 624b. Since the reflector antenna systems 600a, 600b are shown in cross-section in FIGS. 6A and 6B, only a single front and rear catenary cord is show in each figure. However, it should be understood that a plurality of such catenary cords would usually be provided, extending in radial directions similar to that shown with respect to catenary cords 214, 514. The front catenary cords and rear catenary cords may be arranged to form a radial pattern, a rectangular pattern, a triangular pattern, or other variations that might be used to restrain and shape the RF reflecting surface. It should be understood that the cord network disclosed herein is not limited in this regard.

In each of the above-described scenarios, the structural members are shown to have a rectangular or circular cross-sectional profile. However, it should be understood that the structural members disclosed herein are not limited in this regard. Instead they can have a different cross-sectional profile which can be selected to improve the overall strength, rigidity, and weight characteristics of the antenna support structure. For example, in some scenarios the cross-sectional profile can be rectangular, circular, elliptical, triangular, trapezoidal, cross-shaped, diamond, star shaped and/or polygonal. Of course other cross-sectional profiles are also possible including I shaped or T-shaped configurations. The same or different cross-sectional profile can be used in each of the structural members. Structural members having any of the above-described cross-sectional profiles can have a tubular configuration with an at least partially hollow interior, or they can have a solid core configuration.

Figure 7A:
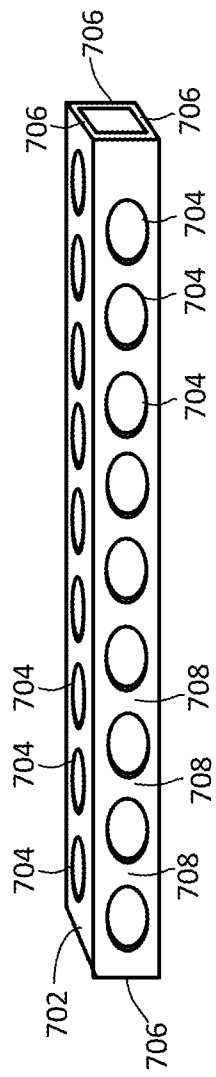
FIGS. 7A-7C are a series of drawing that are useful for understanding various configurations of different types of structural elements associates with a reflector antenna which can be formed using an additive process.
Figure 7B:
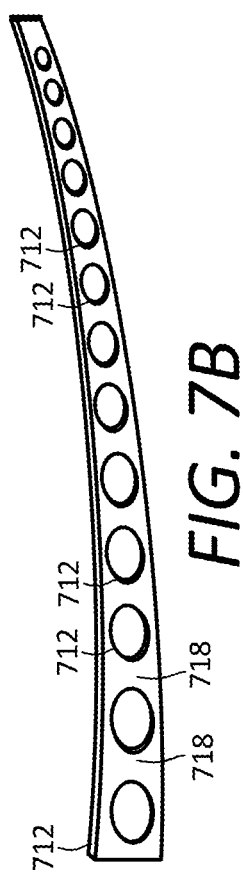
Figure 7C:
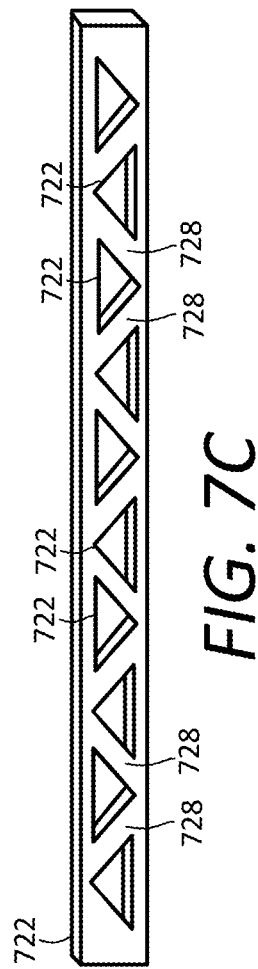

Along the length of each structural member, the cross section may also be reduced or increased in overall dimension or thickness of portions of the cross section. Further, since these structural members are formed by an additive manufacturing process, there may be many openings in the webs and walls of the member to reduce the material required to form each member. For instance, FIG. 7A shows a rectangular structural member 702 in which a row of openings 704 may be formed down the length of each of the four walls 706 which comprise the member. These openings may be circular, triangular, elliptical or other shapes and may serve to divide each web or wall into many smaller cross-members 708 in a truss-like configuration. Other arrangements are also possible. Instead of the structural member 702 having a rectangular configuration formed of four walls, it may have a different number of sides (e.g. 3 or more sides) and can include openings of one or more of the shape types listed above. Further, a structural member 712, 722 formed using the process described herein can be a solid or filled structure as shown in FIGS. 7B and 7C. As with the structural element shown in FIG. 7A, these structural members can include various shaped openings 714, 724 to define structural cross members 718, 728. Accordingly, the on-orbit additive manufacturing solution presented herein facilitates the fabrication of gossamer structures that are optimized for minimum weight, without consideration of launch loads that drive the design of ground-fabricated structures. Weight lightening openings formed in the structural members (e.g., openings 704, 714, 724 are one possible result of this design optimization.

In each of the foregoing examples, the various support structures can be formed in place by the additive fabrication process. In other words, the additive fabrication mechanism can be configured so that the support structure can remain in the location where formed so as to carry out its intended antenna support function. However, the solution is not limited in this regard and in other scenarios, the support structure can be formed by means of an additive fabrication process in a first location, and then repositioned to different location for carrying out the support structure function. Further, it should be understood that the various structural components formed by an additive fabrication process as described herein can be comprised of a single element or multiple elements which are formed concurrently to define a truss. Alternatively, multiple elements can be individually formed in an additive fabrication process and these multiple individual elements can be joined together to form a truss.

Figure 8:
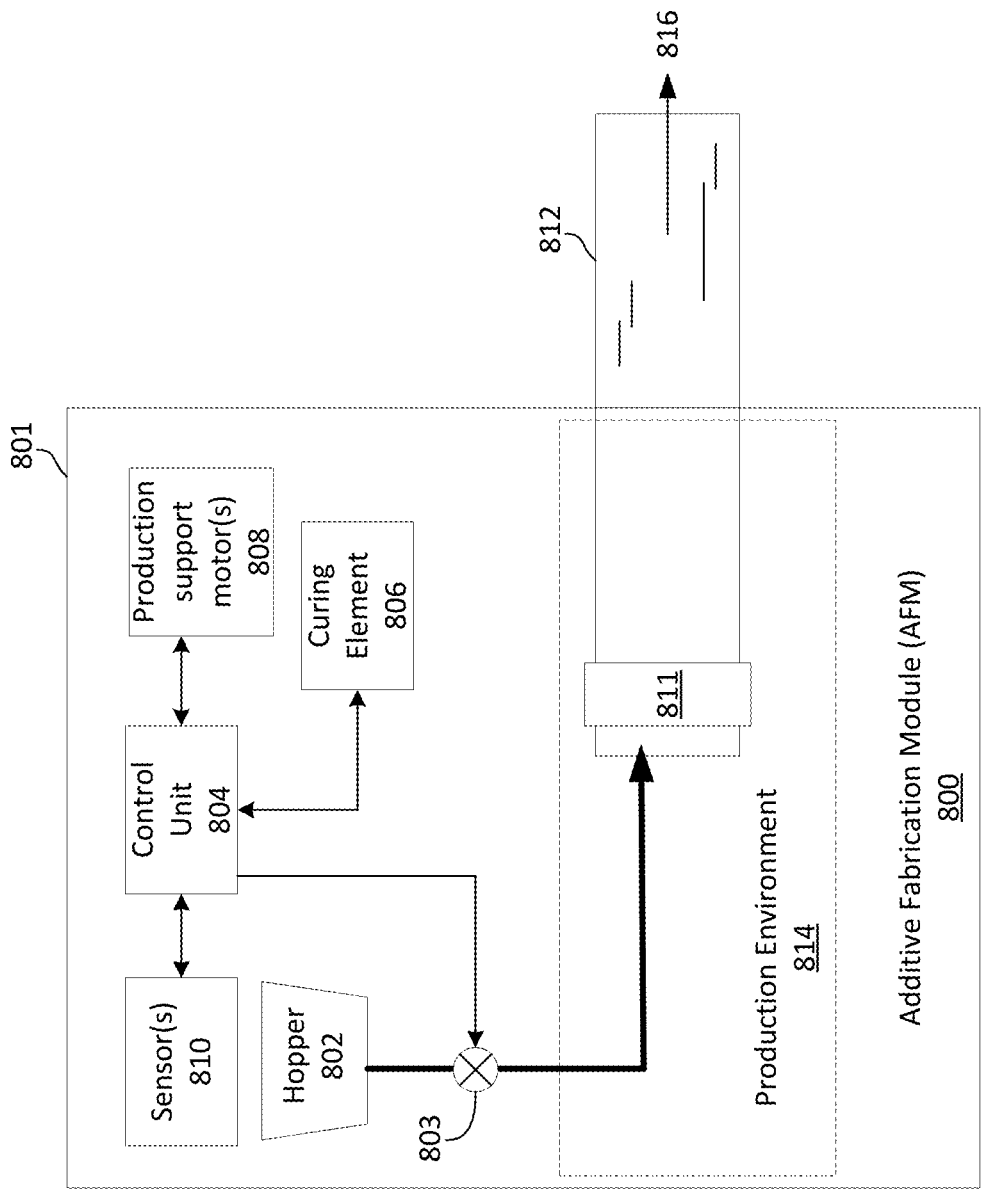
FIG. 8 is a drawing that is useful for understanding an additive fabrication module which facilitates an additive fabrication process.

Each of the antenna systems described herein can comprise at least one additive fabrication module (AFM) 800 as shown in FIG. 8. The AFM 800 is configured to facilitate the additive fabrication processes described herein. As such, the AFM 800 can utilize any additive manufacturing method now known or known in the future. Some examples of additive manufacturing processes that can be used for the purposes of an AFM herein can include vat photopolymerization, powder bed fusion (PBF), binder jetting, material jetting, material extrusion, pultrusion, sheet lamination, directed energy deposition (DED), and hybrid methods involving one or more of the foregoing techniques. One or more of these process are sometimes referred to as 3D printing types of additive fabrication methods. In some scenarios, such 3D printing processes can involve sequentially depositing fabrication material in plurality of layers to gradually form each of the rigid structural elements described herein. Depending on the particular additive fabrication process which is selected, the material that is used to construct the structural members herein can include polymer sheets, metal foils and tapes, UV-curable photopolymer resins, thermoplastic filaments and pellets, liquids and slurries, metal wire, and powders formed of metal, plastics and/or ceramics.

Additive fabrication processes are well-known in the art and therefore will not be described in detail. However, it should be understood that the AFM 800 can include various supporting components to facilitate fabrication operations. Depending on the particular additive fabrication process selected, these components can include one or more of a housing 801, a hopper 802 containing bulk material from which a structural component 812 is fabricated, a material feed control device 803, a control unit 804, a curing element 806, a curing element 806, production support motors, solenoids and/or servos 808, and sensors 810.

The control unit 804 can comprise one or more components such as a processor, an application specific circuit, a programmable logic device, or other circuit programmed to control the fabrication operations within the AFM. The material feed control device 803, production support motors 808, and the feed control device can operated under the control of the control unit 804. For example, the feed control device can receive control signals from the control unit 804 to regulate a feed rate of material to a production environment 814. The curing element 806 can be controlled to facilitate any necessary curing of the bulk material.

In some scenarios, the curing element 806 can be a heating element, a cooling element or a source of optical radiation such as ultraviolet (UV) or infrared (IR) radiation. If the curing element comprises a source of optical radiation, the curing element 806 can comprise a conventional optical source. But in other scenarios (e.g., a 3D printing scenario) the curing element can comprise a laser which has a controlled laser output. In a 3D printing type of additive fabrication process, production support motors, servos and/or solenoids 808 can be used to facilitate the 3D printing operations. However, in other scenarios, such components can be configured to help urge the structural member 812 along a production path 816.

In a scenario where the AFM 800 comprises an extrusion type of additive fabrication system, an extrusion die 811 can be provided. As is known, an additive process extrusion process is one in which a flowable material comprising the at least one rigid structural element is urged through a die and is then allowed to cure. In such a scenario, the material feed control device 803 can comprise one or more of a pump and/or a valve to control a pressurized flow of raw bulk material from a material reservoir or hopper 802 to an injection port of the extrusion die 811.

One or more fabrication modules or AFMs can be provided in a central or peripheral hub as described herein to facilitate the antenna deployment process. In some scenarios, it can be necessary to coordinate the operation of the one or more fabrication modules or AFMs to ensure that the antenna support structure is properly deployed. Accordingly, the reflector antenna systems 100, 200, 300 and 400 can each include a central deployment control unit or CDCU. The CDCU can comprise one or more components such as a processor, an application specific circuit, a programmable logic device, a digital signal processor, or other circuit programmed to perform the functions described herein. The system can be realized in one computer system or as several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Figure 9:
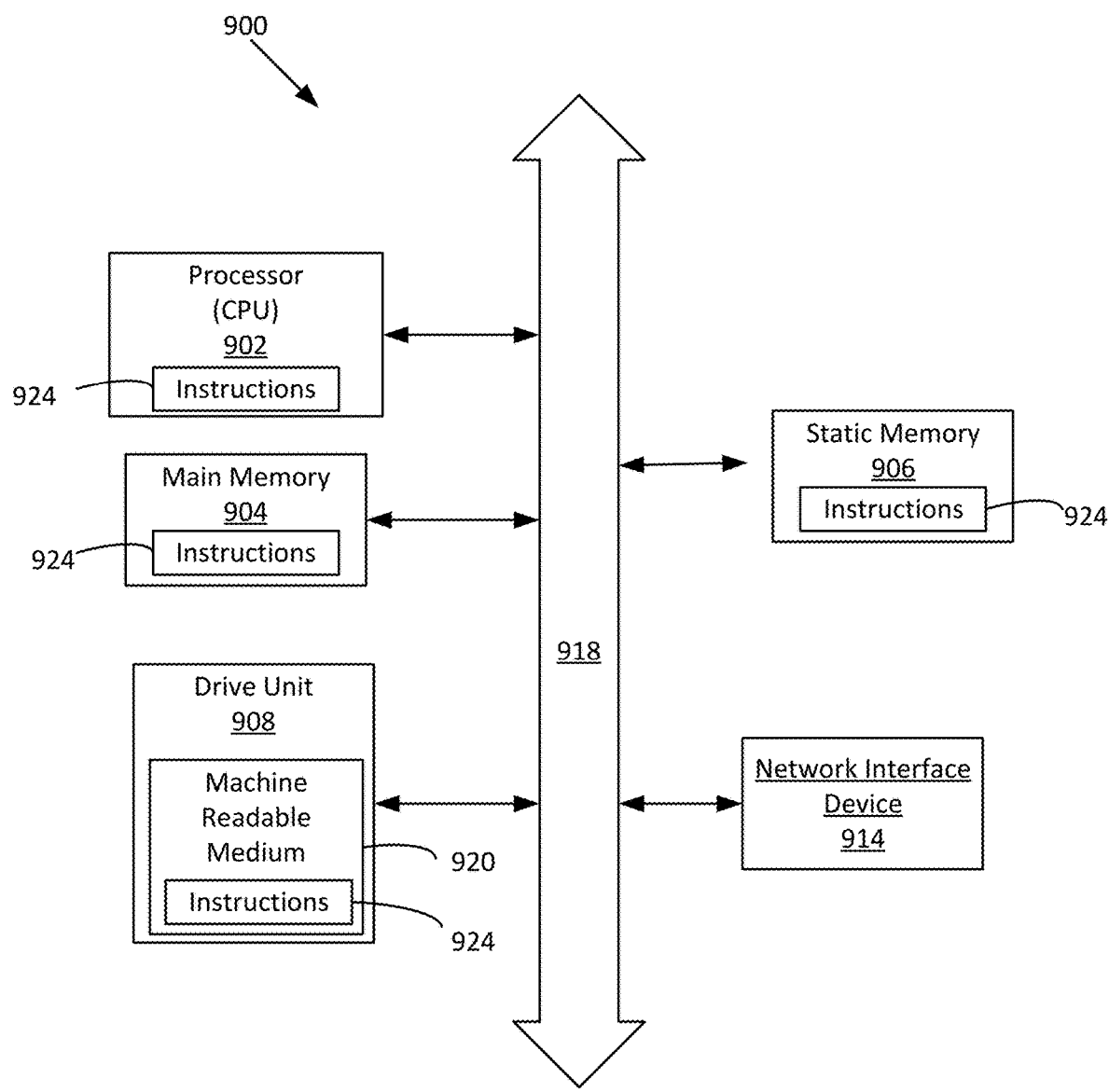
FIG. 9 is a block diagram of an exemplary computer system that can perform processing operations as described herein for purposes of implementing a deployable antenna support structure formed by an additive fabrication process.

Computer systems as referenced herein can comprise any type of data processing device capable of executing a set of instructions (sequential or otherwise) that specifies actions to be taken by that device. Referring now to FIG. 9, there is shown a hardware block diagram comprising an exemplary computer system 900 which can be used for coordinating the additive manufacturing deployment operation. The machine can include a set of instructions which are used to cause the computer system to perform any one or more of the methodologies discussed herein. In some scenarios, the computer 900 can operate independently as a standalone device. However, the disclosure is not limited in this regard and in other scenarios the computer system can be operatively connected (networked) to other machines in a distributed environment to facilitate certain operations described herein. Accordingly, while only a single machine is illustrated it should be understood that in other scenarios the system can be taken to involve any collection of machines that individually or jointly execute one or more sets of instructions as described herein.

The computer system 900 is comprised of a processor 902 (e.g. a central processing unit or CPU), a main memory 904, a static memory 906, a drive unit 908 for mass data storage and comprised of machine readable media 920, input/output devices 910, and a network interface device 914. Communications among these various components can be facilitated by means of a data bus 918. One or more sets of instructions 924 can be stored completely or partially in one or more of the main memory 904, static memory 906, and drive unit 908. The instructions can also reside within the processor 902 during execution thereof by the computer system. The network interface device 914 can be comprised of hardware components and software or firmware to facilitate wired or wireless network data communications in accordance with a network communication protocol utilized by a data network.

The drive unit 908 can comprise a machine readable medium 920 on which is stored one or more sets of instructions 924 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 900 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with a particular implementation is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for deploying a reflector antenna system, comprising:
   transporting the reflector antenna system to a deployment location;
   at said deployment location,
      using an additive fabrication process to form at least one rigid structural element of a reflector antenna;
      attaching a portion of an RF reflector material formed of a flexible web to a portion of the at least one rigid structural element;
      causing deployment of the flexible web from a stowed configuration to an extended configuration by using the additive fabrication process to increase a length of the at least one rigid structural element to which the flexible web has been attached; and
      upon completion of the deployment, facilitating support of the flexible web in a predetermined shape using the at least one-rigid structural element.

2. The method according to claim 1, wherein the RF reflector material is a metallic woven mesh.

3. The method according to claim 1, wherein the RF reflector material is secured to the at least one rigid structural element after the rigid structural element is at least partially formed.

4. The method according to claim 1, wherein the additive fabrication process is a 3D printing process in which material is sequentially deposited in layers to form the at least one rigid structural element.

5. The method according to claim 1, wherein the additive fabrication process is at least one of an extrusion process and a pultrusion process in which a material comprising the at least one rigid structural element is urged through a die.

6. The method according to claim 1, wherein the additive fabrication process is performed at a central hub.

7. The method according to claim 6, wherein a plurality of the rigid structural elements are formed so as to extend in radial directions originating at the central hub.

8. The method according to claim 7, wherein a peripheral edge of the flexible web is secured to a tip end of each of the rigid structural elements distal from the central hub.

9. The method according to claim 8, wherein the flexible web is deployed by causing the tip ends to extend in radial directions as a result of the additive fabrication process.

10. The method according to claim 8, wherein the peripheral edge is secured to the tip end of each rigid structural element indirectly through an offset member which extends from the tip end in at least one direction transverse to the rigid structural element.

11. The method according to claim 7, wherein the flexible web is secured to each of the plurality of rigid structural elements at predetermined intervals as the additive fabrication process progresses.

12. The method according to claim 1, wherein the additive fabrication process further comprises forming the at least one rigid structural element to extend along a non-linear path extending from a perimeter hub.

13. The method according to claim 12, further comprising continuing the additive fabrication process until the non-linear path results in a distal end of the at least one rigid structural element returning to the perimeter hub.

14. The method according to claim 12, further comprising selecting the non-linear path to be a curved path forming a hoop that begins and ends at the perimeter hub.

15. The method according to claim 12, further comprising securing the flexible web to the hoop at predetermined intervals along the non-linear path as the additive fabrication process progresses.

16. The method according to claim 1, wherein the additive fabrication process comprises forming a plurality of the rigid structural elements to extend linearly from a perimeter hub.

17. The method according to claim 16, wherein the additive fabrication process is controlled to selectively form the plurality of rigid structural elements to have different predetermined lengths.

18. The method according to claim 16, wherein at least one point along a peripheral edge of the flexible web is secured to the peripheral hub.

19. The method according to claim 1, wherein the deployment location is an space-based orbital location.

20. The method according to claim 1, further comprising supporting with the at least one rigid structural element a network of cords which define the predetermined shape of the flexible web.

* * * * *